US007830460B2

(12) United States Patent
Ido

(10) Patent No.: US 7,830,460 B2
(45) Date of Patent: Nov. 9, 2010

(54) ELECTRONIC APPARATUS

(75) Inventor: Kenjiro Ido, Kawagoe (JP)

(73) Assignee: Pioneer Corporation, Tokyo (JP)

( * ) Notice: Subject to any disclaimer, the term of this patent is extended or adjusted under 35 U.S.C. 154(b) by 760 days.

(21) Appl. No.: 11/574,842

(22) PCT Filed: Aug. 31, 2005

(86) PCT No.: PCT/JP2005/015885

§ 371 (c)(1),
(2), (4) Date: May 21, 2007

(87) PCT Pub. No.: WO2006/027980

PCT Pub. Date: Mar. 16, 2006

(65) Prior Publication Data

US 2008/0013264 A1 Jan. 17, 2008

(30) Foreign Application Priority Data

Sep. 7, 2004 (JP) ............................. 2004-259911

(51) Int. Cl.
*H04N 5/64* (2006.01)
*G06F 1/16* (2006.01)
*H05K 5/00* (2006.01)
*H05K 7/00* (2006.01)
(52) U.S. Cl. .............. 348/837; 361/679.02; 361/679.21
(58) Field of Classification Search ............ 361/679.02, 361/679.55, 679.21; 348/837
See application file for complete search history.

(56) References Cited

U.S. PATENT DOCUMENTS 5,335,142 A * 8/1994 Anderson .............. 361/679.55
6,532,146 B1 * 3/2003 Duquette ................ 361/679.04
6,549,789 B1 * 4/2003 Kfoury .................... 455/550.1
6,731,350 B2 * 5/2004 Endo et al. .................. 348/837
6,816,177 B2 * 11/2004 Wang et al. ................. 348/837
6,859,219 B1 * 2/2005 Sall ............................ 345/1.1
2005/0018392 A1 * 1/2005 Strohmeier et al. ......... 361/683

FOREIGN PATENT DOCUMENTS

| JP | 06-062684 U | 9/1994 |
| JP | 08-116503 A | 5/1996 |
| JP | 09-109788 A | 4/1997 |
| JP | 10-297381 A | 11/1998 |
| JP | 11-278167 A | 10/1999 |
| JP | 2001-030849 A | 2/2001 |
| JP | 2002-337621 A | 11/2002 |
| JP | 2003-239943 A | 8/2003 |
| WO | WO 2005/096710 A2 | 10/2005 |

* cited by examiner

*Primary Examiner*—Jayprakash N Gandhi
*Assistant Examiner*—Adrian S Wilson
(74) *Attorney, Agent, or Firm*—Foley & Lardner LLP

(57) ABSTRACT

An electronic device includes a movable unit, a turn support member, a rotation support member, and a stopper. The turn support member is housed in a casing to be freely taken in and out, and used at a regular standing position and an opposite standing position. The turn support member turnably supports the movable unit. The rotation support member rotatably supports the movable unit. The stopper positions the movable unit when the movable unit turns from the regular standing position or the opposite standing position to a reference position. The stopper positions the movable unit in a predetermined state when the movable unit rotates at the reference position.

9 Claims, 12 Drawing Sheets

ELECTRONIC APPARATUS

TECHNICAL FIELD

The present invention relates to an electronic device including a movable unit mounted on, for example, a dashboard of a vehicle and housed in the dashboard to be freely taken in and out.

BACKGROUND ART

For example, a liquid crystal panel is used for a display unit (a movable unit) of a display device (an electronic device) mounted on a dashboard of a vehicle, by utilizing an advantage that it can be formed small and thin. However, even if the display unit is a small and thin liquid crystal panel, because the space in the vehicle is limited, it is difficult to secure a space for keeping the display unit outside the dashboard at all times.

In recent years, therefore, a so-called housing-type display device that is embedded in a dashboard and used by pulling it out as required has been proposed. There have been proposed many types of housing-type display devices, and among these, a flat display unit is popular. The flat display unit is housed substantially horizontally in a dashboard, and at the time of use, pulled out like a drawer toward the front and made to stand so that its liquid crystal panel faces an operator.

In such a drawer-like housing-type display device, a casing for housing a display unit is fitted in a dashboard of a vehicle with an opening facing the front. Accordingly, the display unit is embedded in the dashboard when unused, and is pulled out of the casing toward the front and made to stand during use for screen display operation (for example, see Patent Document 1).

At the time of use, if the display unit is a manually-operated type, it is pulled out of the casing toward the operator's side and made to stand with an appropriate angle by using a support mechanism on the casing side as a fulcrum. Meanwhile, if the display unit includes driving means, for example, when a pulling start button (not shown) or the like is operated, a forwarding mechanism is driven to push the display unit out from the casing, and the display unit turns to a predetermined angle via the support mechanism.

On the other hand, when the display unit is not used, the manually-operated display unit is brought down horizontally via the support mechanism, and pushed into the casing and housed. Whereas, in the display unit including the driving means, for example, when a pullback start button (not shown) is operated, the display unit is brought down horizontally via the support mechanism and brought back into the casing by the forwarding mechanism.

Patent Document 1: Japanese Patent Application Laid-open No. 2002-337621

DISCLOSURE OF INVENTION

Problem to be Solved by the Invention

In the drawer-like housing-type display device described above, however, because a sliding operation and a turning operation are performed, it is necessary to perform positioning reliably, accurately, and with high durability with respect to repeated operations at various positions important in the operation, for example, as one of the positions, at a slide housing position. It is important how to make the positioning right. Generally, as the number of operation shafts increases, a positioning structure becomes complicated and the number of stoppers also increases, resulting in a cost increase. Therefore, the positioning structure is one of the problems, for which improvement is required at the moment.

On the other hand, in recent years, electronic devices provided in a dashboard have been increasing. In addition, because a dashboard itself is small in sports utility vehicles, even the housing-type display device is difficult to be installed. That is, the display unit can block a part of visual field, make operations of other devices difficult, or block a cooling air outlet of an air conditioner, at the standing position where the liquid crystal panel is directed toward an operator so that the display unit can be used. Therefore, there is an increasing demand for making the display unit usable not only at the standing position but also at other positions.

There is a similar demand with respect to a drawer-like housing-type manually-operated device including an operating unit, such as on-board audio equipment.

According to the conventional technique, however, in the housing-type display unit and an operating unit (hereinafter, both are referred to as a movable unit), to position the movable unit securely and reliably, for example, at the slide housing position as an important position in the operation, the structure becomes complicated and its cost increases. Further, in the electronic device where the movable unit can be used at both positions of a regular standing position and an opposite standing position where the movable unit turns to the other side and stands in an opposite direction, the movable unit makes a complicated movement until reaching both the usable positions, and a positioning mechanism in the movement becomes further complicated. This causes a cost increase, and therefore there is a demand for improvement.

The present invention has been achieved to solve the above problems, and it is an object of the present invention to provide an electronic device in which a movable unit can be used at a regular standing position where the movable unit is turned to one direction from a reference position pulled out of a casing and made to stand, and an opposite standing position where the movable unit is turned to another direction and made to stand in the opposite direction, wherein positioning can be performed reliably with a simple structure with respect to a plurality of positions that are important in the operation, the durability with respect to repeated operations can be improved due to the simple structure, and as a result, cost reduction can be realized and reliability can be improved.

Means for Solving Problem

To overcome the problems mentioned above and achieve the object, an electronic device includes a movable unit, a turn support member that movably supports the movable unit between a housing position where the movable unit is housed in a casing and a reference position where the movable unit is pulled out of the casing, axially supports one end of the movable unit on the casing side to support the movable unit turnably between a regular standing position where the movable unit stands in one direction with respect to the reference position and the reference position, and also support the movable unit turnably between an opposite standing position where the movable unit stands in an opposite direction to the one direction and the reference position, and a stopper that abuts the movable unit when the movable unit turns from the regular standing position to the reference position to lock and position the movable unit at the reference position, and abuts the movable unit when the movable unit turns from the opposite standing position to the reference position to lock and position the movable unit at the reference position.

BRIEF DESCRIPTION OF DRAWINGS

FIG. 8-1 is a perspective view of the movable unit at a housing position.

FIG. 8-2 is a perspective view of the movable unit in a first direction state at the reference position.

FIG. 8-3 is a perspective view of the movable unit at a position between the reference position and a regular standing position.

FIG. 8-4 is a perspective view of the movable unit at the regular standing position.

FIG. 8-5 is a perspective view of the movable unit in a state between the first direction state and a second direction state.

FIG. 8-6 is a perspective view of the movable unit in the second direction state at the reference position.

FIG. 8-7 is a perspective view of the movable unit at a position between the reference position and an opposite standing position.

FIG. 8-8 is a perspective view of the movable unit at the opposite standing position.

FIG. 9-1 is a detailed perspective view of the movable unit shown in FIG. 8-2 in the first direction state at the reference position.

FIG. 9-2 is a detailed perspective view of the movable unit shown in FIG. 8-4 at the regular standing position.

FIG. 9-3 is a detailed perspective view of the movable unit shown in FIG. 8-6 in the second direction state at the reference position.

FIG. 9-4 is a detailed perspective view of the movable unit shown in FIG. 8-8 in the opposite standing position.

EXPLANATIONS OF LETTERS OR NUMERALS

Figure 1:
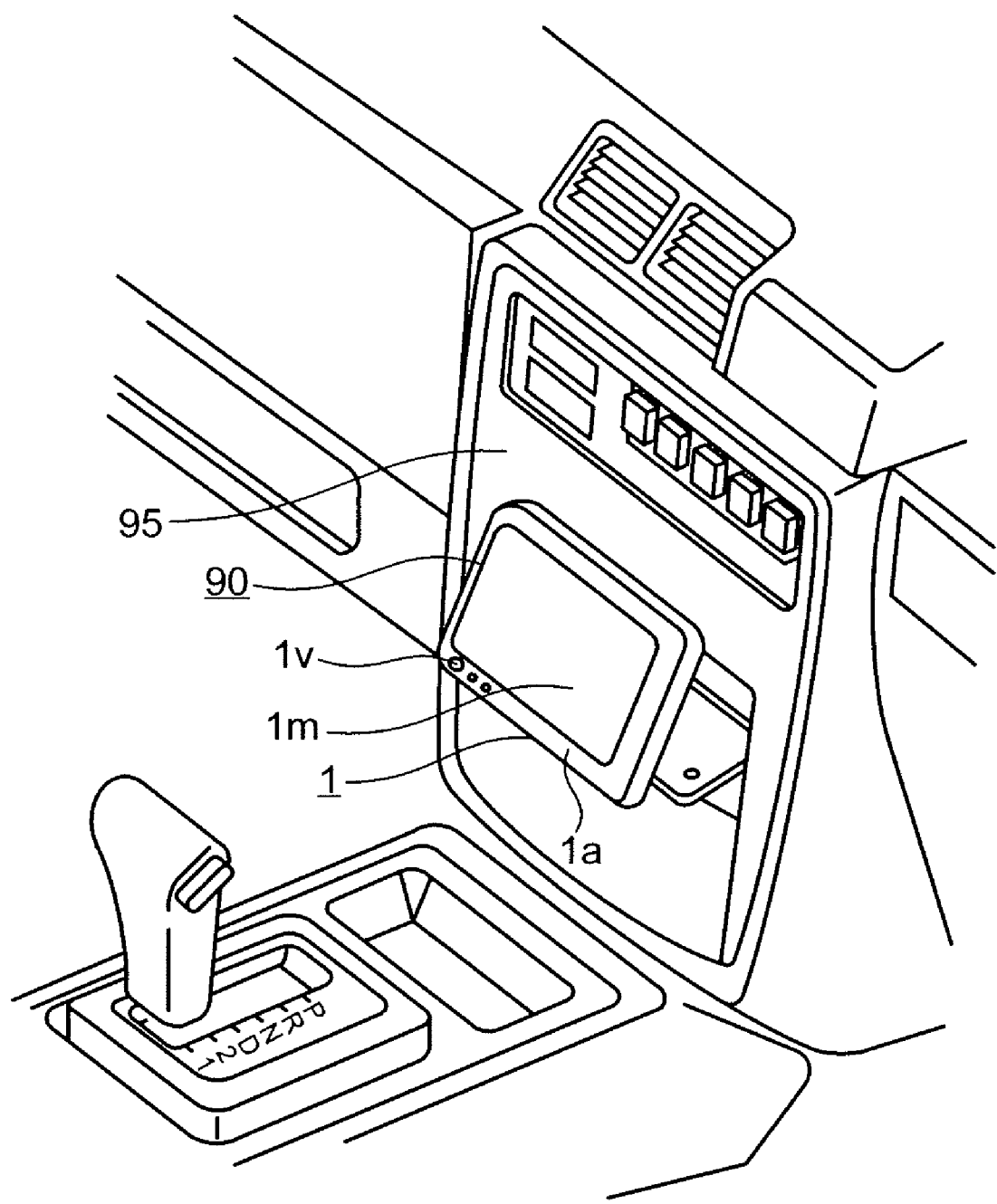
FIG. 1 is a perspective view of an electronic device mounted on a dashboard of a vehicle according to a first embodiment of the present invention.

1 Movable unit
1a Display operation surface of movable unit
1b First claw of movable unit
1c Second claw of movable unit
1m Liquid crystal panel (Display surface)
1v Operation button (Operation surface)
2 Casing
2a First principal surface of casing
2b Second principal surface of casing
2f Opening of casing
10 Turn support member
4 Slide casing
5 First support arm
6 Second support arm
7, 8 Turn shaft
11 Swing casing
12 Rotation shaft
20 Rotation support member
30 Stopper
40 Movement driving unit
41 First motor (for movement)
50 Turn driving unit
51 Second motor (for turn)
60 Rotation driving unit
61 Third motor (for rotation)
71 Housing position
72 Reference position
73 Regular standing position
74 Opposite standing position
75 First direction state
76 Second direction state

BEST MODE(S) FOR CARRYING OUT THE INVENTION

According to one embodiment of the present invention, an electronic device includes a movable unit, a turn support member, and a stopper. The turn support member movably supports the movable unit between a housing position where the movable unit is housed in a casing and a reference position where the movable unit is pulled out of the casing. The turn support member also axially supports one end of the movable unit on the casing side to support the movable unit turnably between a regular standing position where the movable unit stands in one direction with respect to the reference position and the reference position as well as between an opposite standing position where the movable unit stands in an opposite direction to the one direction and the reference position. The stopper abuts the movable unit when the movable unit turns from the regular standing position to the reference position to lock the movable unit and position it at the reference position, and abuts the movable unit when the movable unit turns from the opposite standing position to the reference position to lock the movable unit and position it at the reference position.

In the electronic device, because the stopper locks the movable unit to position it at the reference position when the movable unit moves from the regular standing position to the reference position and moves from the opposite standing position to the reference position, the movable unit can be positioned by one stopper in these operations. Accordingly, reliable positioning can be realized with a simple structure, and the durability with respect to repeated operations can be improved due to the simple structure. As a result, cost reduction can be realized and reliability can be improved.

In one aspect of the electronic device, the movable unit includes at least one of a display surface capable of displaying information thereon and an operation button that allows an input operation. In this embodiment, the movable unit including the display surface or the operation button can be used at the standing position and the opposite standing position, and housed in a housing position.

In another aspect of the electronic device, the electronic device further includes a rotation support member that supports the movable unit rotatably about a rotation shaft extending in an in-and-out direction to and from the casing at the reference position. The stopper positions the movable unit rotating at the reference position in a first direction state where one face of the movable unit faces one direction and in a second direction state where the one face of the movable unit faces a direction opposite to the one direction. In this aspect, the stopper further positions the movable unit for rotation in two directions. Accordingly, it is possible to realize the electronic device, in which the movable unit can be directed in multi-directions, having a simple structure with less manufacturing cost and improved reliability.

In another aspect of the electronic device, the movable unit includes first and second claws at positions substantially symmetrical about the rotation shaft as a symmetrical axis, and the stopper positions the movable unit in the first and second direction states by abutting the first and second claws.

In the above aspect, in the rotation of the movable unit about the rotation shaft, a structure for abutting the stopper can be realized by a simple means such as a claw, which enables further simple structure and cost reduction, and improvement in the reliability.

In another aspect, the electronic device further includes a turn driving unit that turns the movable unit from the regular standing position to the reference position and also from the opposite standing position to the reference position. The stopper abuts the movable unit when the turn driving unit turns the movable unit from the regular standing position to the reference position to position and lock the movable unit at the reference position, and also abuts the movable unit when the turn driving unit turns the movable unit from the opposite standing position to the reference position to position and lock the movable unit at the reference position.

In the above aspect, only one stopper can position the movable unit even when the turn driving unit turns the movable unit. Accordingly, a simple structure and cost reduction can be realized, erroneous operations can be suppressed, and the reliability can be improved.

In still another aspect, the electronic device further includes a rotation driving unit that rotates the movable unit at the reference position. The stopper positions the movable unit in the second direction state when the rotation driving unit rotates the movable unit at the reference position from the first direction state to the second direction state, and also positions the movable unit in the first direction state when the rotation driving unit rotates the movable unit at the reference position from the second direction state to the first direction state.

In the above aspect, only one stopper can position the movable unit even when the rotation driving unit rotates the movable unit. Accordingly, a simple structure and cost reduction can be realized, erroneous operations can be suppressed, and the reliability can be improved.

The term "display surface" as used herein refers to a screen for displaying information such as a liquid crystal panel and a flat cathode-ray tube screen. The term "operation surface" as used herein refers to a surface capable of receiving operation input, for example, a touch panel or a surface provided with operation buttons.

First Embodiment

FIG. 1 is a perspective view of an electronic device mounted on a dashboard of a vehicle according to a first embodiment of the present invention. An electronic device 90 includes a box-type casing (not shown) embedded in the dashboard of the vehicle, and a movable unit 1 housed in the box-type casing to be freely taken in and out like a drawer. The box-type casing (not shown) is embedded in the dashboard of the vehicle. The movable unit 1 includes a liquid crystal panel 1m as the display surface and an operation button 1v as the operation surface on a display operation surface 1a directed toward an operator.

Figure 2:
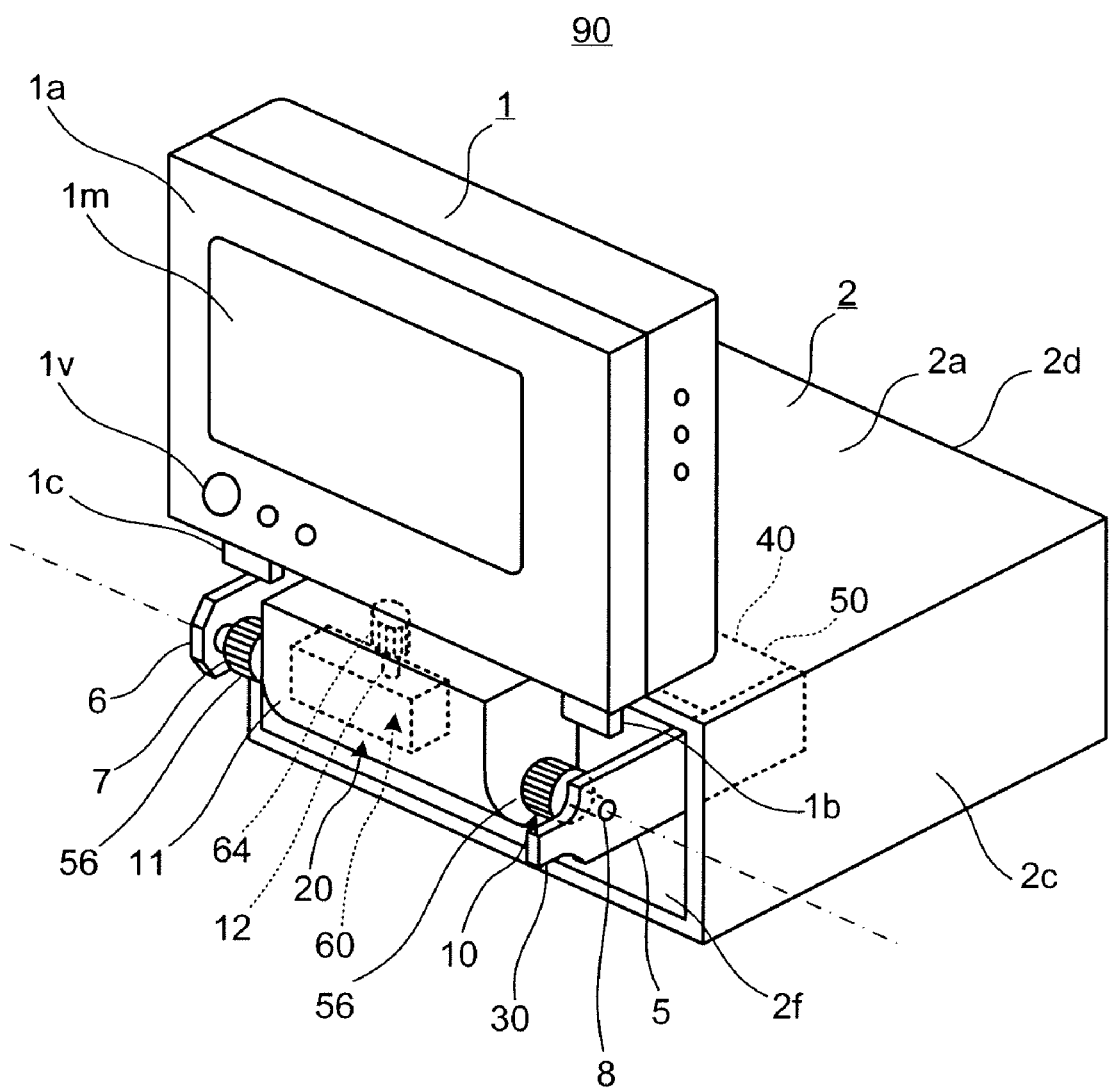
FIG. 2 is a perspective view the electronic device shown in FIG. 1 that is taken out of the dashboard.
Figure 3:
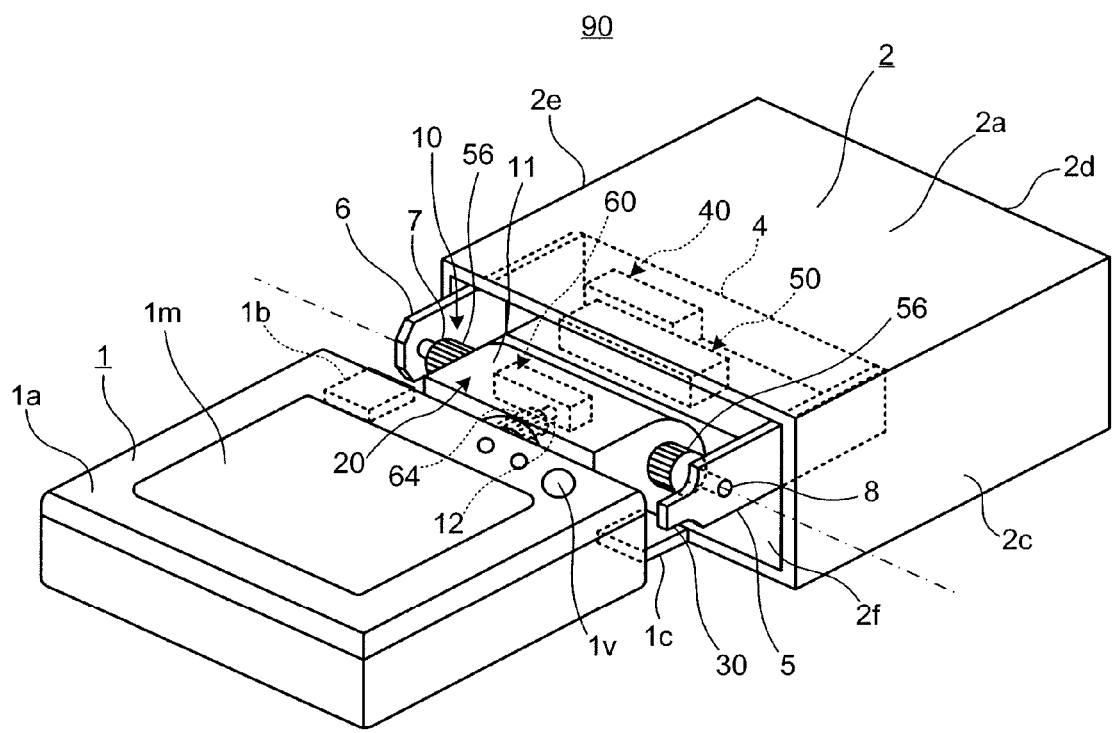
FIG. 3 is a perspective view of a movable unit at a reference position.
Figure 4:
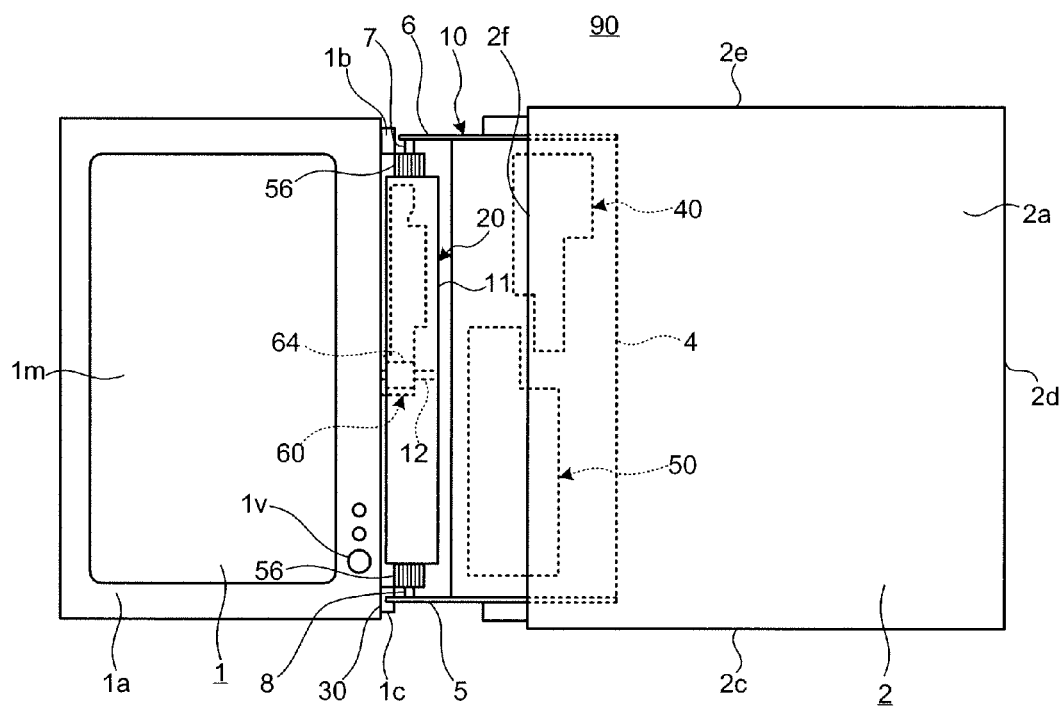
FIG. 4 is a front view of the movable unit at the reference position.
Figure 5:
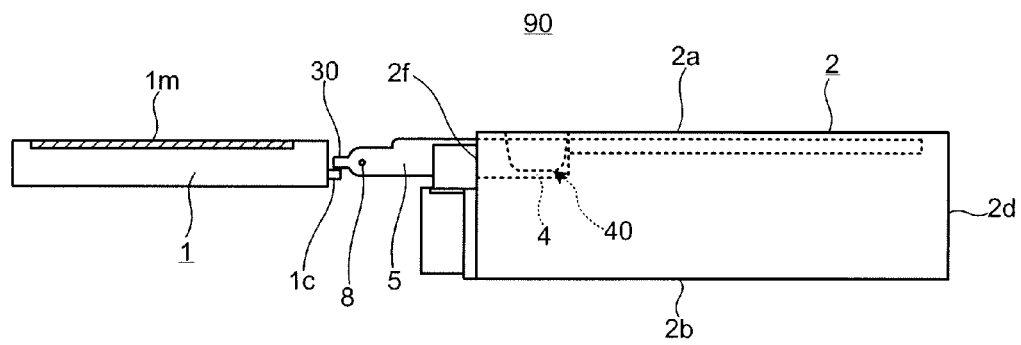
FIG. 5 is a side view of the movable unit at the reference position.

FIG. 2 is a perspective view of the electronic device 90 shown in FIG. 1 that is taken out of the dashboard. FIG. 3 is a perspective view of the movable unit at the reference position. FIG. 4 is a front view of the movable unit shown in FIG. 3. FIG. 5 is a side view of the movable unit shown FIG. 4. In FIGS. 2 to 5, the electronic device 90 includes the movable unit 1 and a casing 2 that houses the movable unit 1 to be freely taken in and out.

The movable unit 1 has a rectangular plate form, and is mounted with the liquid crystal panel 1m on the display operation surface 1a on one side for forming a large-area face. The operation button 1v is provided on the display operation surface 1a adjacent to the liquid crystal panel 1m. Plate-like first and second claws 1b and 1c, which are relevant parts in the embodiment, are arranged in a standing condition on the side of the movable unit 1 on the operation button 1v side.

On the other hand, the casing 2 is made of sheet metal in a substantially rectangular and flat hexahedral box shape, and includes a first principal surface 2a and a second principal surface 2b opposing the first principal surface 2a having a large area, and three side surfaces 2c, 2d, and 2e respectively connected to the side of both the principal surfaces 2a and 2b to form a box. An opening 2f is provided on one side face of the casing 2, and the movable unit 1 is taken in and out via the opening 2f. The reference position of the movable unit 1 is a position at which the movable unit 1 slides and is pulled out of the housing position in the casing 2, and specifically, a position at which the large-area face of the movable unit 1 and the principal surface 2a of the casing 2 are present in parallel planes with each other. When the movable unit 1 is housed in the casing 2, the movable unit 1 is always positioned at the reference position and then housed in the casing 2.

The movable unit 1 is rotatably supported by a rotation support member 20. The rotation support member 20 is turnably supported by a turn support member 10.

The turn support member 10 includes a slide casing 4 made of sheet metal and housed in the casing 2, and a pair of first and second arms 5 and 6, with a base being respectively fixed on both sides of the slide casing 4 and an end respectively protruding from the opening 2f of the casing 2.

The slide casing 4 is in a rectangular and flat box shape having a longitudinal length slightly shorter than an inner width of the casing 2 and a short width in a depth direction, stored in the casing 2 like a drawer, guided by a guide (not shown) provided in the casing 2, and supported movably in the depth direction of the casing 2.

The first and second arms 5 and 6 each have a slender thin-plate shape with substantially the same width as the height of the side of the slide casing 4. Principal surfaces of the first and second arms 5 and 6 are attached to the sides of the slide casing 4, and the end of each protrudes from the opening 2f of the casing 2 and extending parallel to the first principal surface 2a of the casing 2. A stopper 30, which is a relevant part in the embodiment, is formed at the end of the first arm 5 on one side to protrude in the longitudinal direction of the first arm 5.

The rotation support member 20 includes a swing casing 11 axially supported rotatably by the first and second arms 5 and 6 via turn shafts 7 and 8, and a rotation shaft 12 with one end being protruded from the swing casing 11. The side of the movable unit 1 on the operation button 1v side is fixed to the rotation shaft 12.

The swing casing 11 is made of sheet metal in a slender and pillar box shape. Fixing gears 56, 56, to which a driving force is transmitted from the turn driving unit, are fixed to both ends of the swing casing 11. The driving force is transmitted from the turn driving unit to the fixing gears 56, 56 for rotating the movable unit 1. The short turn shafts 7 and 8 are respectively fixed coaxially with the gears 56, 56 on the outward end faces of the fixing gears 56, 56. The swing casing 11, the fixing gears 56, 56 and the turn shafts 7 and 8 integrally formed in this manner are arranged between the first and second arms, and axially supported rotatably by both the first and second arms 5 and 6 by inserting the turn shafts 7 and 8 into a supporting hole punched on both the arms.

The rotation shaft 12 extending in a direction orthogonal to the longitudinal direction of the swing casing 11 (same direction as the moving direction of the slide casing 4) is rotatably supported at the center of the swing casing 11. The movable unit 1 is fixed to one end of the rotation shaft 12 protruding from the swing casing 11. The fixing gear 64 is penetrated and fitted in the rotation shaft 12. The driving force is transmitted from the rotation driving unit to the fixing gear 64 for rotating the movable unit 1.

The electronic device 90 is mounted with three driving units 40, 50, and 60. The movement driving unit 40 and the turn driving unit 50 are installed in the slide casing 4. The rotation driving unit 60 is installed in the swing casing 11. The movement driving unit 40 is a driving source for taking the movable unit 1 in and out with respect to the casing 2 by advancing or retracting the slide casing 4. The turn driving unit 50 is a driving source for turning the movable unit 1 with respect to the casing 2. The rotation driving unit 60 is a driving source for rotating the movable unit 1 with respect to the swing casing 11.

Figure 6:
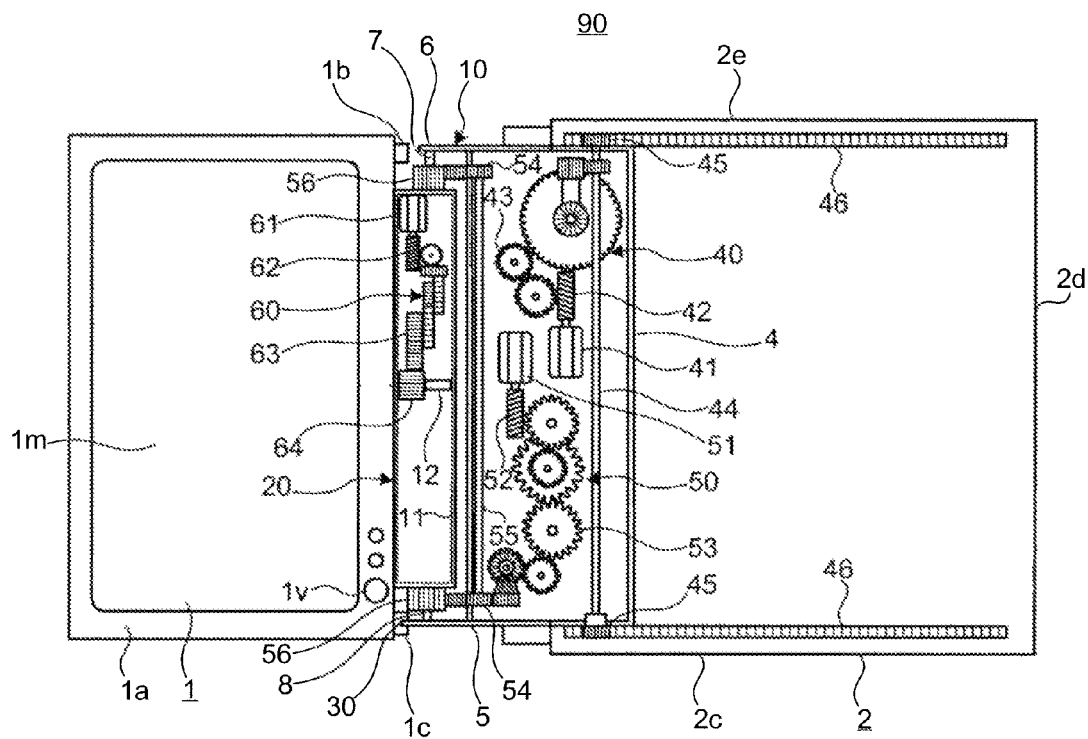
FIG. 6 is a perspective front view of inside the electronic device for explaining driving units thereof.
Figure 7:
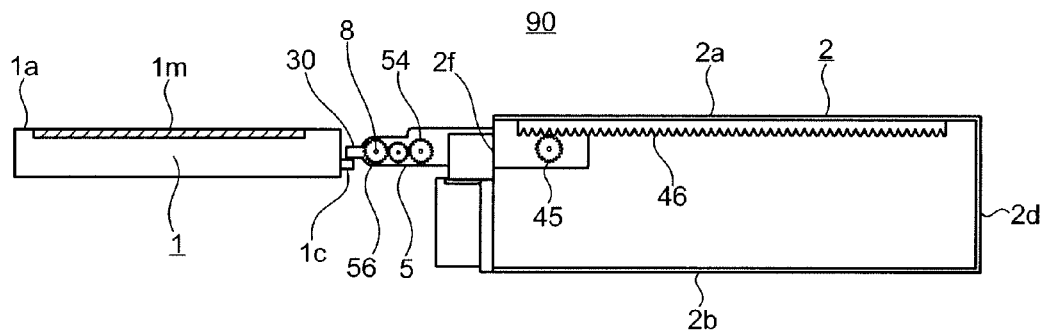
FIG. 7 is a perspective side view of inside the electronic device for explaining the driving units.

FIG. 6 is a perspective front view of inside the electronic device for explaining the respective driving units. FIG. 7 is a perspective side view. In FIGS. 6 and 7, a first motor 41, which is a movement motor for sliding the slide casing 4 in the casing 2, is provided in the movement driving unit 40. A worm gear 42 is fitted to the driving shaft of the first motor 41. A shaft 44 is provided to run through the slide casing 4. The opposite ends of the shaft 44 respectively protrude from the slide casing 4. Pinion gears 45, 45 are fixed to the protruded portions. A connection gear group 43 formed by combining a plurality of gears is intervened between the worm gear 42 and the pinion gears 45, 45. The driving force of the first motor 41 is transmitted to the pinion gears 45, 45 via the worm gear 42, the connection gear group 43, and the shaft 44.

On the other hand, a pair of rack gears 46, 46 is arranged parallel with each other on the opposite sides of the casing 2. The pinion gears 45, 45 are engaged with the rack gears 46, 46. When the driving force of the first motor 41 is transmitted to the pinion gears 45, 45, the slide casing 4 slides. At this time, because the driving force transmitted to the one of the pinion gears 45, 45 is transmitted to the other pinion gear 45 via the shaft 44, the slide casing 4 can slide properly. The slide casing 4 advances or retracts in the casing 2 due to normal rotation or reverse rotation of the first motor 41, however, the slide casing 4 is respectively stopped by a lock mechanism (not shown) provided on the inner side of the casing 2 and a lock mechanism (not shown) provided on the opening 2ƒ side of the casing 2. These positions correspond to the housing position and the reference position of the movable unit.

A second motor 51, which is a rotation motor for rotating the movable unit 1, is provided in the turn driving unit 50. A worm gear 52 is fitted to a driving shaft of the second motor 51. A shaft 55 runs through the side of the swing casing 11 of the swing casing 11. Shaft gears 54, 54 are fixed to the opposite ends of the shaft 55. A connection gear group 53 intervenes between the worm gear 52 and the lower shaft gear 54 shown in FIG. 6. The fixing gears 56, 56 are fixed to the opposite ends of the swing casing 11. The driving force of the second motor 51 is transmitted to the fixing gears 56, 56 via the worm gear 52, the connection gear group 53, the shaft 55, and the shaft gears 54, 54. Accordingly, the swing casing 11 and the movable unit 1 rotate.

A third motor 61, which is a rotation motor for rotating the movable unit 1 is provided on the rotation driving unit 60. A worm gear 62 is fitted to the driving shaft of the third motor 61. A connection gear group 63 intervenes between the worm gear 62 and the rotation shaft 12. The driving force of the third motor 61 is transmitted to the rotation shaft 12 via the worm gear 62 and the connection gear group 63, thereby rotating the movable unit 1.

Figures 1, 8:
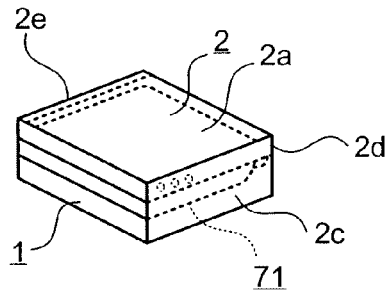
Figures 2, 8:
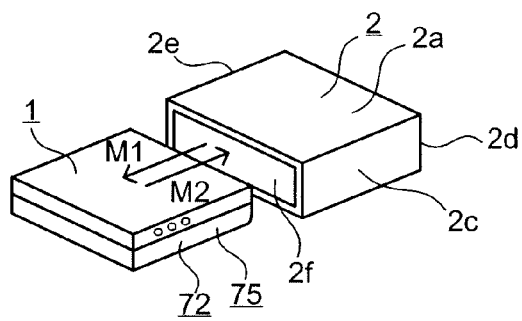
Figures 3, 8:
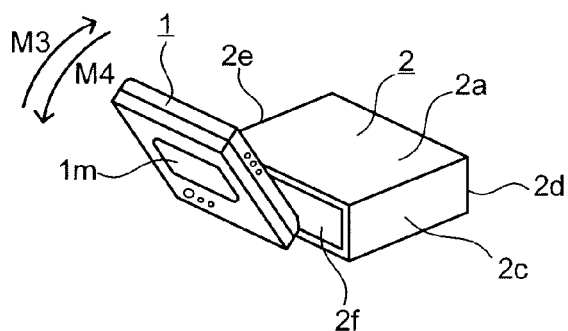
Figures 4, 8:
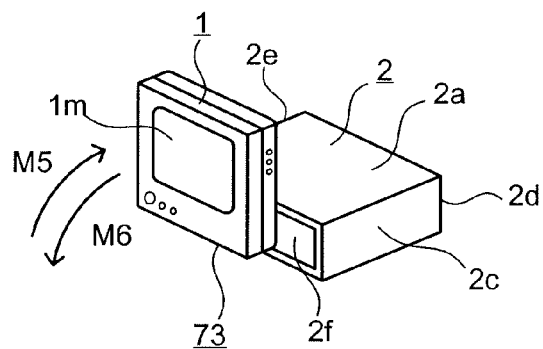
Figures 5, 8:
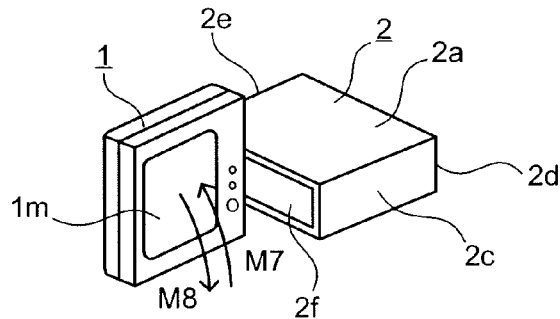
Figures 6, 8:
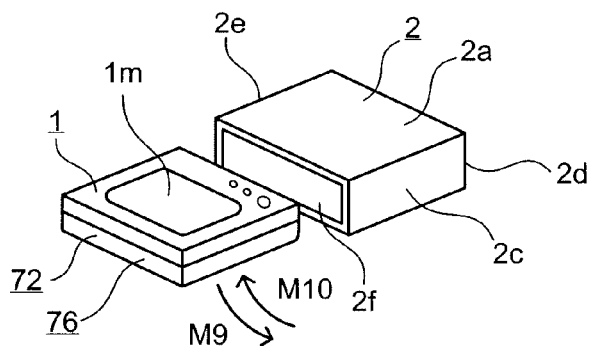
Figures 7, 8:
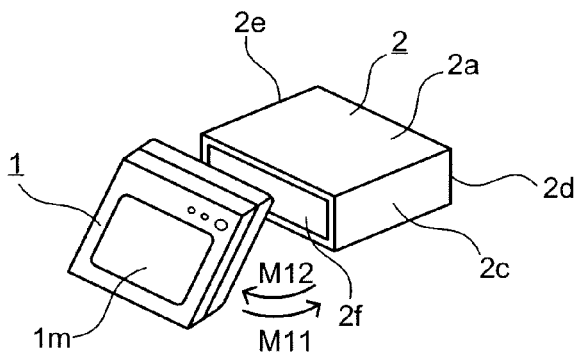
Figure 8:
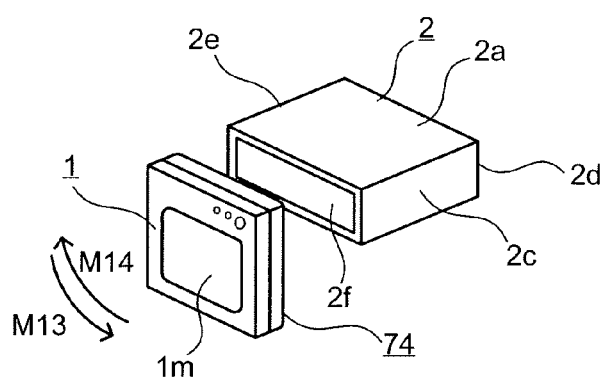
Figures 1, 9:
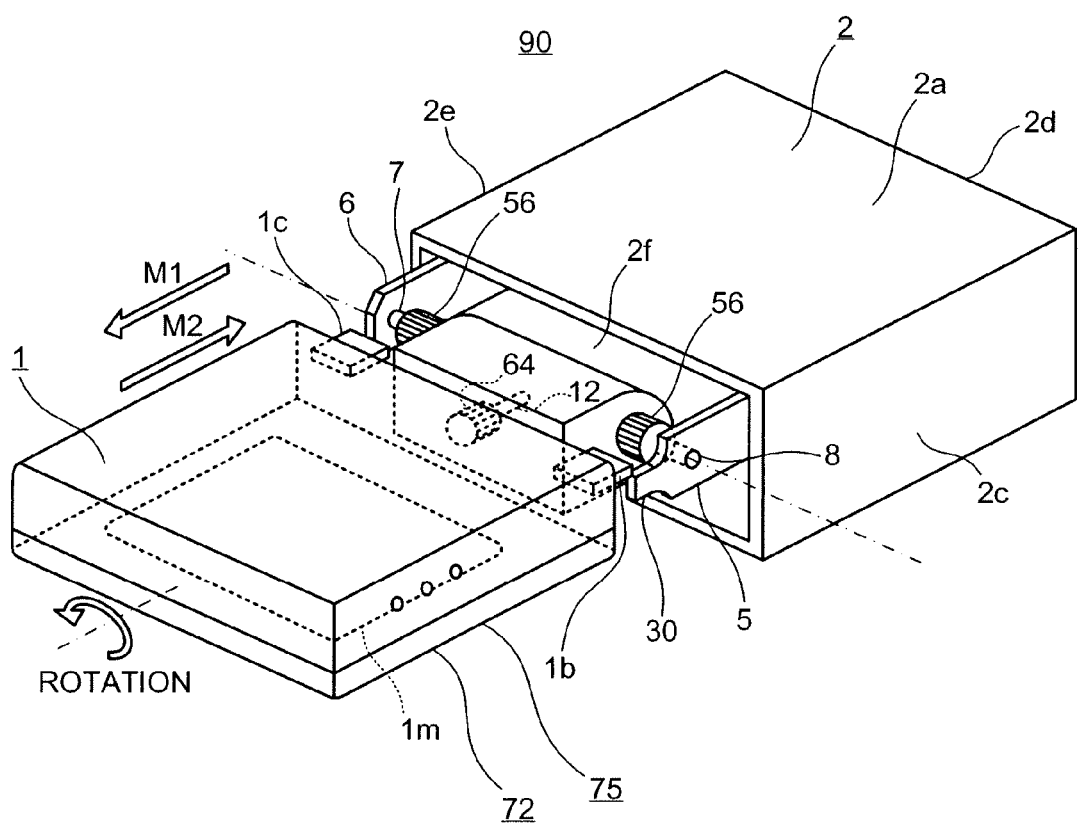
Figures 2, 9:
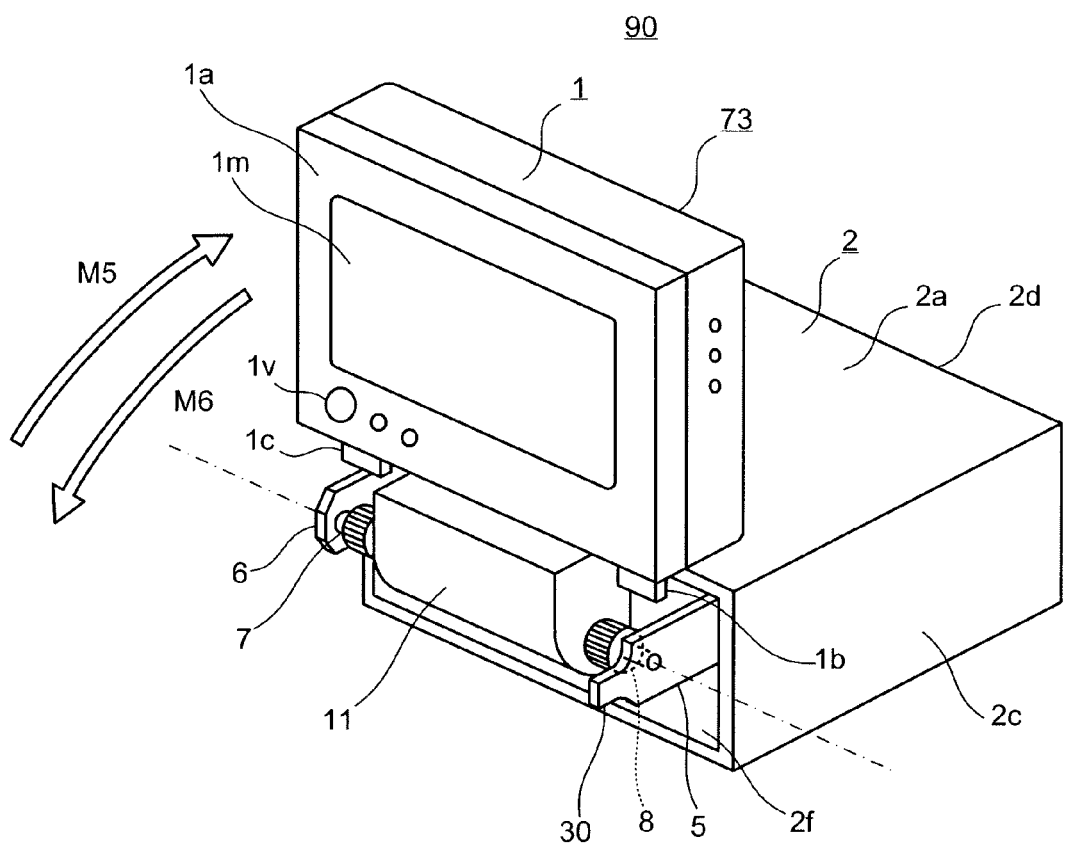
Figures 3, 9:
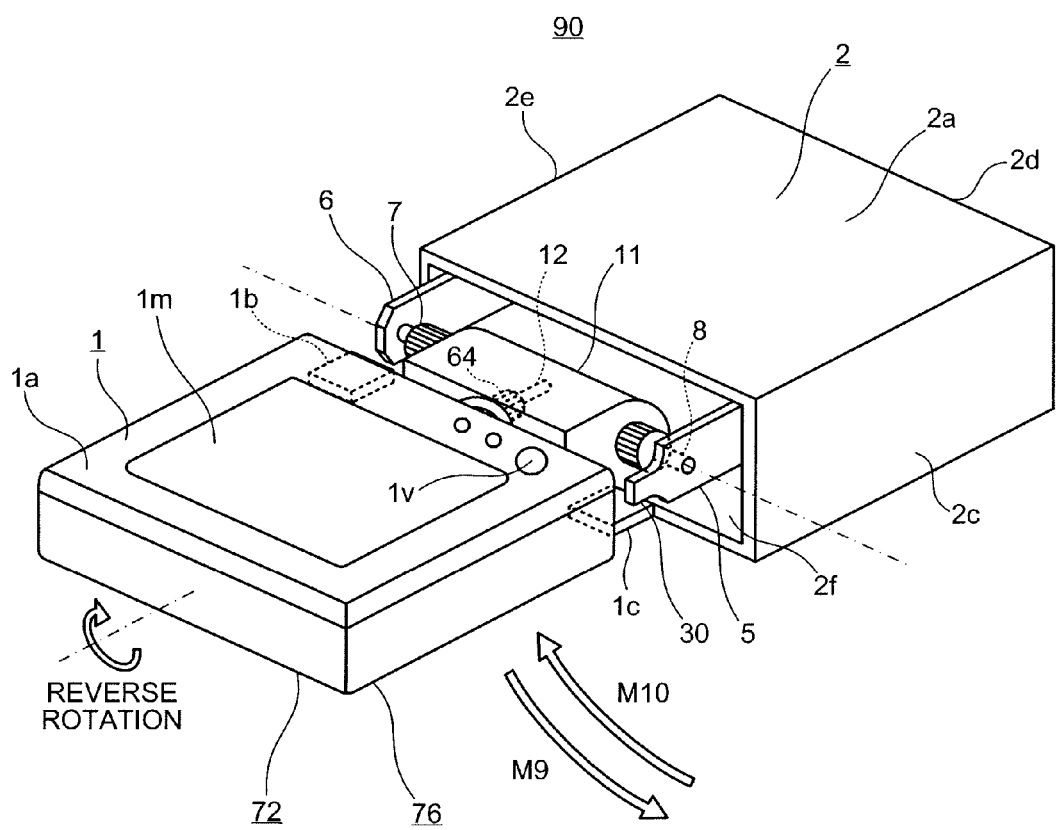
Figures 4, 9:
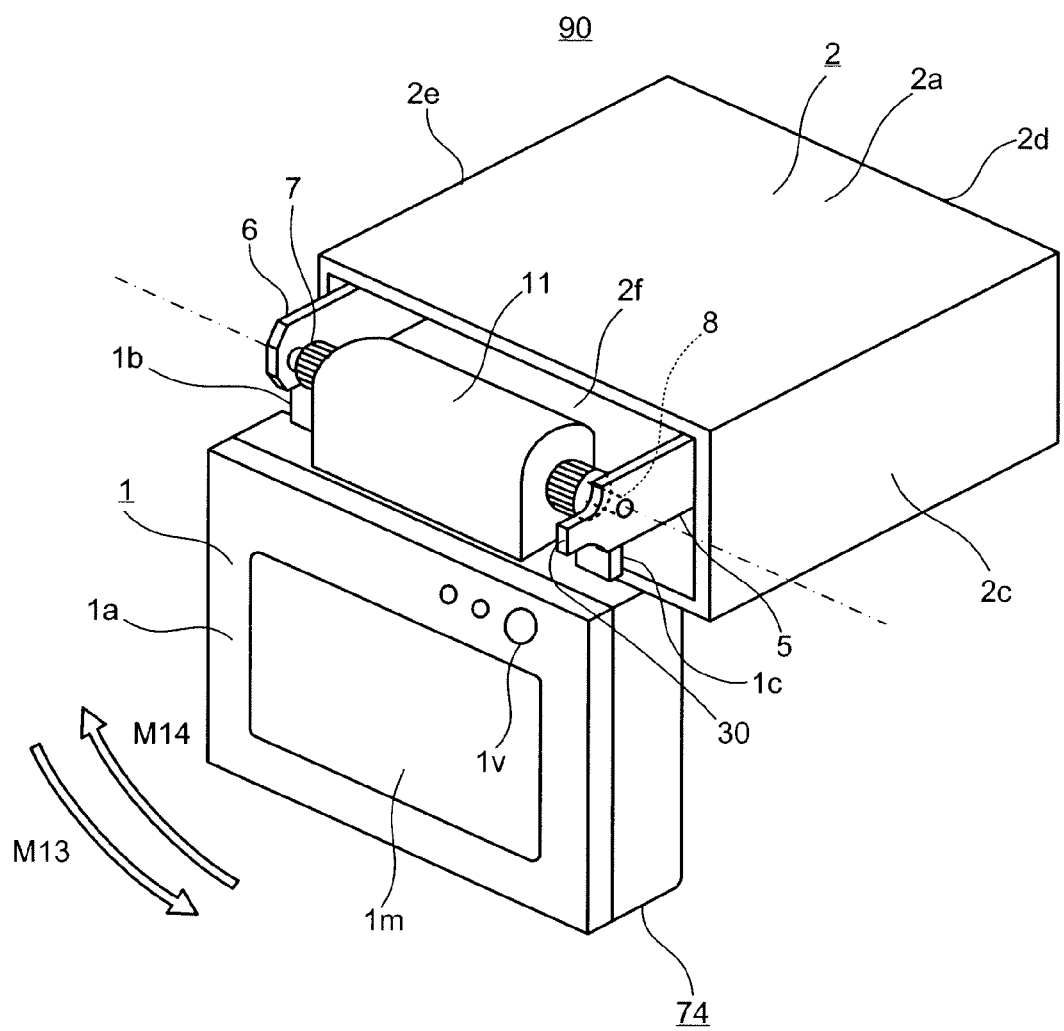

The operation is explained with reference to FIGS. 8-1 to 8-8 and FIGS. 9-1 to 9-4. FIGS. 8-1 to 8-8 are perspective views of the movable unit 1 at various positions with respect to the casing 2. A support structure of the movable unit 1 is omitted in the respective diagrams. FIG. 8-1 is a perspective view of the movable unit 1 at a housing position 71. FIG. 8-2 is a perspective view of the movable unit 1 in a first direction state 75 at a reference position 72. FIG. 8-3 is a perspective view of the movable unit 1 at a position between the reference position 72 and a regular standing position 73. FIG. 8-4 is a perspective view of the movable unit 1 at the regular standing position 73. FIG. 8-5 is a perspective view of the movable unit 1 in a state between the first direction state 75 and a second direction state 76. FIG. 8-6 is a perspective view of the movable unit 1 in the second direction state at the reference position 72. FIG. 8-7 is a perspective view of the movable unit 1 at a position between the reference position 72 and an opposite standing position 74. FIG. 8-8 is a perspective view of the movable unit 1 at the opposite standing position 74. FIG. 9-1 is a detailed perspective view of the movable unit 1 in FIG. 8-2. FIG. 9-2 is a detailed perspective view of the movable unit 1 shown in FIG. 8-4. FIG. 9-3 is a detailed perspective view of the movable unit 1 shown in FIG. 8-6. FIG. 9-4 is a detailed perspective view of the movable unit 1 shown in FIG. 8-8.

In FIG. 8-1, the movable unit 1 is housed so that the whole unit is embedded in the casing 2 at the housing position 71. When the movable unit 1 is at the housing position 71 shown in FIG. 8-1 and the movement driving unit 40 drives the movable unit 1 in a normal direction, as shown in FIG. 8-2, the movable unit 1 slides and is pulled out of the opening 2ƒ, as shown by arrow M1, in a horizontal plane parallel to the first principal surface 2a of the casing 2. The pulled out position of the movable unit 1 is the reference position 72. At the reference position 72, the entire movable unit 1 can be seen and the swing casing 11 can be seen as well. In this state, the movable unit 1 is in the first direction state 75 with the display operation surface 1a thereof being directed to the second principal surface 2b side of the casing 2.

Arrow M3 in FIG. 8-3 represents an operation such that the movable unit 1 turns from the reference position 72 shown in FIG. 8-2 toward the regular standing position 73 (arrow M4 represents an opposite operation). In a state where the movable unit 1 is in the first direction state 75 at the reference position 72, when the turn driving unit 50 drives the movable unit 1 in a reverse turning direction, the movable unit 1 turns from the reference position 72 toward the regular standing position 73 as shown by the arrow M3, by using the turn shafts 7 and 8 as a shaft.

The movable unit 1 further turns, as shown by arrow M5, from the state shown in FIG. 8-3 to reach the regular standing position 73 shown in FIGS. 8-4 and 9-2. The movable unit 1 is in a usable state at the regular standing position 73, with the liquid crystal panel 1m facing the operator. The regular standing position 73 is a position where the movable unit 1 stands on the first principal surface 2a side of the casing 2, however, the movable unit 1 does not necessarily stand vertically with respect to the first principal surface 2a, and the movable unit 1 can stand, inclining by a predetermined angle as shown in FIG. 1. In practice, the regular standing position 73 can be set to an optional angle by the user. However, the largest angle to be set is about 120 degrees. When the movable unit 1 reaches this angle, for example, an existing position detector using a sensor or the like detects the inclination, so that the movable unit 1 can be used.

When the turn driving unit 50 drives the movable unit 1 in a normal turning direction from the regular standing position 73 shown in FIGS. 8-4 and 9-2, the movable unit 1 operates to return to the reference position 72 as shown by arrows M6 (FIG. 8-4) and M4 (FIG. 8-3). The movable unit 1 finally returns to the reference position 72 as shown in FIGS. 8-2 and 9-1. At the last step of the operation, the stopper 30 abuts the first claw 1b of the movable unit 1. The stopper 30 then accurately positions the movable unit 1 at the reference position 72. At the reference position 72, when the movement driving unit 40 drives the movable unit 1 in a reverse direction, the movable unit 1 slides, as shown by arrow M2, to return to the housing position 71 shown in FIG. 8-1.

Arrow M7 in FIG. 8-5 represents a condition where the movable unit 1 rotates from the first direction state 75 shown in FIG. 8-2 toward the second direction state 76 (arrow M8 depicts an opposite operation). In a state where the movable unit 1 is in the first direction state 75 at the reference position 72, when the rotation driving unit 60 drives the movable unit 1 in a normal rotation direction, the movable unit 1 rotates about the rotation shaft 12 as shown by the arrow M7.

In FIGS. 8-6 and 9-3, the display operation surface 1a of the movable unit 1 is in the second direction state 76 directed to the first principal surface 2a side of the casing 2 at the reference position 72. That is, the second direction state 76 is in a so-called a reverse state, rotated by 180 degrees about the rotation shaft 12 from the first direction state 75 shown in FIG. 8-2. In an operation in which the movable unit 1 further rotates in a direction of the arrow M7 from the state shown in FIG. 8-5 to reach the second direction state 76, at the last step of the operation, the stopper 30 abuts the second claw 1c of the movable unit 1 to accurately position the movable unit 1 in the second direction state 76. The position of the movable unit 1 is detected by a sensor (not shown), or the movable unit 1 can rotate only at the reference position 72 by a predetermined operation regulating structure. That is, the movable unit 1 cannot rotate at a position other than the reference position 72.

In the embodiment, the term "turn" refers to reciprocating motion of the movable unit 1 between the reference position 72 and the regular standing position 73 (the same applies to the opposite standing position 74) about the turn shafts 7 and 8 as an axis, that is, reciprocating movement within an angular range of roughly 120 degrees at maximum about the turn shafts 7 and 8 as an axis. On the other hand, the term "rotation" refers to reciprocating motion of the movable unit 1 between the first direction state 75 and the second direction state 76 about the rotation shaft 12 as an axis, that is, reciprocating movement within an angular range of 180 degrees about the rotation shaft 12 as an axis.

Arrow M11 in FIG. 8-7 represents a condition where the movable unit 1 turns from the reference position 72 toward the opposite standing position 74 (arrow M12 represents an opposite operation). At the reference position 72 shown in FIGS. 8-6 and 9-3, when the turn driving unit 50 drives the movable unit 1 in the normal turning direction from a state where the movable unit 1 is in the second direction state 76, the movable unit 1 turns from the reference position 72 toward the opposite standing position 74 as shown by arrows M9 (FIG. 8-6), M11 (FIG. 8-7), and M13 (FIG. 8-8), using the turn shafts 7 and 8 as an axis.

The movable unit 1 reaches the opposite standing position 74 shown in FIGS. 8-8 and 9-4. The opposite standing position 74 includes not only a position where the movable unit 1 stands vertically with respect to the second principal surface 2b but also a state where the movable unit 1 inclines by a predetermined angle, as in the regular standing position 73. Actually, the opposite standing position 74 is a position at which the movable unit 1 turns by about 120 degrees at maximum from the reference position 72 toward a direction opposite to the regular standing position 73. The movable unit 1 is in a usable state at the opposite standing position 74, with the liquid crystal panel 1m of the movable unit 1 facing the operator. Although the liquid crystal panel 1m is upside-down as compared to the regular standing position 73, an image is controlled by an image controller (not shown) and displayed in a normal direction. A detector (not shown) such as a sensor detects whether the movable unit 1 is at the regular standing position 73 or at the opposite standing position 74, and the detection result is output to the image controller.

When the turn driving unit 50 drives the movable unit 1 in a reverse direction from the opposite standing position 74 shown in FIGS. 8-8 and 9-4, as shown by arrows M14 (FIG. 8-8), M12 (FIG. 8-7), and M10 (FIG. 8-6), the movable unit 1 operates to return to the reference position 72 shown in FIGS. 8-6 and 9-3. At the last step of the operation, the stopper 30 abuts the second claw 1c of the movable unit 1. The stopper 30 accurately positions the movable unit 1 at the reference position 72.

In the state where the movable unit 1 is in the second direction state 76 at the reference position 72 shown in FIG. 8-6 and 9-3, when the rotation driving unit 60 drives the movable unit 1 in a reverse rotation direction, the movable unit 1 rotates. The arrow M8 in FIG. 8-5 represents a condition where the movable unit 1 rotates from the second direction state 76 shown in FIG. 8-6 to the first direction state 75. The movable unit 1 then returns to the first direction state 75 at the reference position 72 shown in FIGS. 8-2 and 9-1.

In FIGS. 8-2 and 9-1, the movable unit 1 returns to the first direction state 75 where the display operation surface 1a is directed to the second principal surface 2b side of the casing 2. In the operation in which the movable unit 1 reaches the reference position 72 from the state shown in FIG. 8-5, the stopper 30 abuts the first claw 1b of the movable unit 1 at the last step of the operation, to accurately position the movable unit 1 in the first direction state 75.

The electronic device 90 according to the embodiment includes the movable unit 1, the turn support member 10 that rotatably supports the movable unit 1, and the stopper 30 that positions the movable unit 1 at an important position in rotating operation. That is, the turn support member 10 movably supports the movable unit 1 between the housing position 71 for storing the movable unit 1 in the casing 2 and the reference position 72 where the movable unit 1 is pulled out of the casing 2, and axially supports one end of the movable unit 1 on the casing 2 side at the reference position 72 to support the movable unit 1 turnably between the regular standing position 73 and the reference position 72, and between the opposite standing position 74 and the reference position 72. The stopper 30 abuts the movable unit 1 when the movable unit 1 moves from the regular standing position 73 to the reference position 72 to lock the movable unit 1 to be positioned at the reference position 72, and abuts the movable unit 1 when the movable unit 1 moves from the opposite standing position 74 to the reference position 72 to lock the movable unit 1 to be positioned at the reference position 72. Therefore, the movable unit 1 can be positioned at the important positions in the operation by the one stopper 30 in both operations, and hence, the movable unit 1 can be securely positioned by a simple structure, with the durability with respect to the repeated operations being improved due to the simple structure. As a result, cots reduction can be realized, thereby improving the reliability.

Further, the electronic device 90 includes the rotation support member 20 that rotatably supports the movable unit 1 about the axis of rotation. The stopper 30 positions the movable unit 1 rotating at the reference position 72 in the first direction state 75 where a first face is directed to a first direction, that is, for example, the display operation surface 1a is directed to the second principal surface 2b, and in the second direction state 76 where the first face is directed to a direction opposite to the first direction, that is, the display operation surface 1a is rotated from the first direction state 75 by 180 degrees. Accordingly, the stopper 30 can position the movable unit 1 in the two rotating operations. As a result, the one stopper 30 can position the movable unit 1 in two turning operations and two rotating operations.

The movable unit 1 includes the first and second claws 1b and 1c at positions substantially symmetrical about the rotation shaft 12 as an symmetrical axis. The stopper 30 abuts the first and second claws 1b and 1c, to lock the movable unit 1 at the reference position 72, thereby positioning the movable unit 1 in the first and second direction states 75 and 76. Therefore, in rotation about the rotation shaft 12, a structure for abutting the stopper can be realized by a simple structure such as the first and second claws 1b and 1c, thereby realizing a simple structure and cost reduction, and improving the reliability.

The electronic device 90 further includes the turn driving unit 50 that moves the movable unit 1 from the regular standing position 73 to the reference position 72 and from the opposite standing position 74 to the reference position 72. When the turn driving unit 50 moves the movable unit 1 from the regular standing position 73 to the reference position 72, the stopper 30 abuts the movable unit 1 to lock the movable unit 1 to be positioned at the reference position 72, and when the turn driving unit 50 moves the movable unit 1 from the opposite standing position 74 to the reference position 72, the stopper abuts the movable unit 1 to lock the movable unit 1 to be positioned at the reference position 72. Thus, even when the turn driving unit 50 as driving means turns the movable unit 1, the one stopper 30 can position the movable unit 1, thereby enabling a simple structure and cost reduction, suppressing erroneous operations, and improving the reliability.

Further, the electronic device 90 includes the rotation driving unit 60 that rotates the movable unit 1 at the reference position 72, and the stopper 30 positions the movable unit 1 in the second direction state 76 when the rotation driving unit 60 normally rotates the movable unit 1 at the reference position 72 from the first direction state 75 to the second direction state 76, and positions the movable unit 1 in the first direction state 75 when the rotation driving unit 60 reversely rotates the movable unit 1 at the reference position 72 from the second direction state 76 to the first direction state 75. Accordingly, even when the rotation driving unit 60 as the driving means rotates the movable unit 1, the one stopper 30 can position the movable unit 1, thereby enabling a simple structure and cost reduction, suppressing erroneous operations, and improving the reliability.

In the embodiment, the movable unit 1 is moved between the housing position 71 and the reference position 72 by the movement driving unit 40, turned with respect to the casing 2 by the turn driving unit 50, and rotated by the rotation driving unit 60. That is, the movable unit 1 is electrically driven. The stopper 30, which is a structural feature in the embodiment, demonstrates the effect well in an electronic device including such driving means. However, the driving means may not be necessarily provided. That is, even when the driving means are omitted and the movable unit is manually operated, the structural feature in the embodiment can demonstrate the effect. In other words, if the turn support member 10 and the rotation support member 20 are provided, the operator can manually pull out the movable unit 1 to use the movable unit 1 in a predetermined direction. Even in this case, the stopper 30 can position the movable unit 1 in an important position in the operation.

Further, the movable unit 1 in the embodiment has the liquid crystal panel 1m as the display surface and the operation button 1v as the operation surface on the display operation surface 1a. However, the one provided on the display operation surface 1a can be only the liquid crystal panel 1m or the operation button 1v. Further, the display surface can be not only the liquid crystal panel 1m but also a thin cathode-ray tube or a diode screen, and the operation surface can be not only the operation button 1v but also a touch panel or a keyboard.

Second Embodiment

Figure 10:
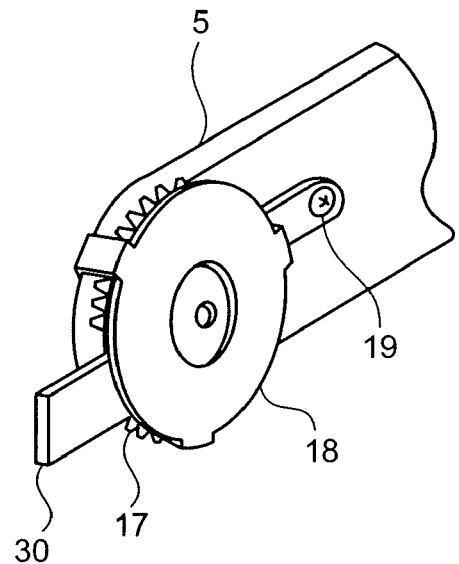
FIG. 10 is a perspective view of an edge of a first arm according to a second embodiment of the present invention.
Figure 11:
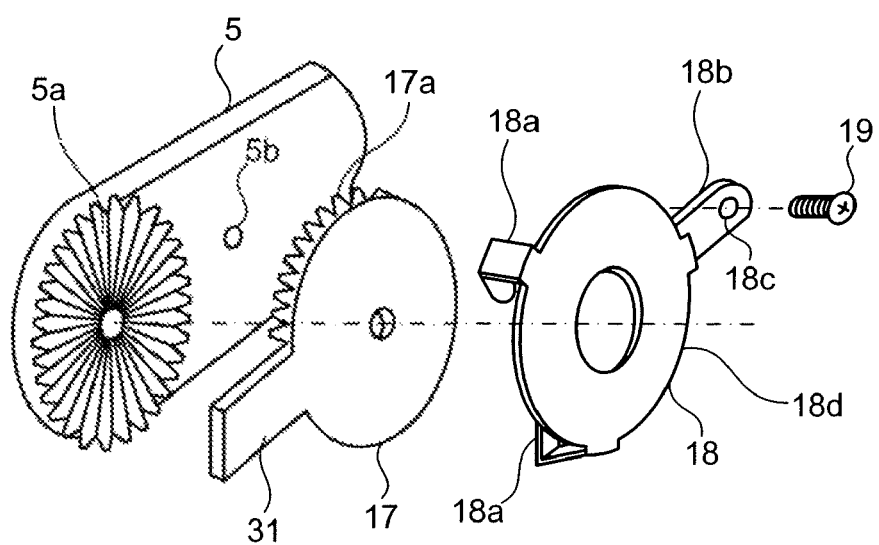
FIG. 11 is a perspective view of the edge of the first arm that is disassembled.

FIG. 10 is a perspective view of an edge of the first arm 5 according to a second embodiment of the present invention. FIG. 11 is a perspective view of the edge of the first arm 5 that is disassembled. The position of a stopper 31 provided at the edge of the first arm 5 of the electronic device according to the embodiment can be finely adjusted in the turning direction of the movable unit (not shown). Other configurations are the same as those of the first embodiment.

In FIG. 10 and FIG. 11, engagement grooves 5a having a continuous hill and valley shape in a circumferential direction are formed over the whole circumference of a through hole for axially supporting the turn shaft 8 (FIG. 9-1) on the principal surface on one side of the edge of the first arm 5. That is, the plurality of engagement grooves 5a is radially formed about the through hole. A female screw hole 5b is provided adjusting to the engagement grooves 5a.

An adjusting plate 17 is fitted to be overlapped on the engagement grooves 5a. The adjusting plate 17 has substantially a disc-like shape, and non-engagement grooves 17a having the same shape as that of the engagement grooves 5a are formed on the principal surface on one side thereof. The convex stopper 31 is formed to protrude radially at a predetermined position on a margin of the adjusting plate 17. The stopper 31 functions in the similar manner to that of the stopper 30 according to the first embodiment. The first arm 5 and the adjusting plate 17 are coupled with each other by a coupling member 18, with the engagement groove 5a and the non-engagement groove 17a engaged with each other.

The coupling member 18 is formed of a disc-like body and three claws extending from a peripheral line of the body. Three claws are formed of two L-shape claws 18a, 18a having an L-shape, and one fastening claw 18b having a crank shape in cross section and a through hole 18c punched therein, into which a screw 19 is inserted. The coupling member 18 couples the first arm 5 with the adjusting plate 17, by engaging hooks at the edges of the L-shape claws 18a, 18a with a rear face of the first arm 5, which is an opposite face of the face having the engagement grooves 5a and fastening the remaining fastening claw 18b by the screw 19 that screws into the female screw hole 5b, with the principal surface of the body being stuck to the adjusting plate 17.

In the electronic device according to the second embodiment, by shifting the engagement of the engagement grooves 5a and the non-engagement grooves 17a the stopper 31 can be shifted with a small angle about an axis of the turn shaft 8 (FIG. 9-1). Accordingly, the position of the movable unit 1 at the reference position 72 shown in FIG. 9-1 can be finely adjusted in the turning direction. Therefore, even if the position of the movable unit 1 at the reference position 72 is slightly shifted in the turning direction, due to a manufacturing error or permanent set in fatigue by being used for long time, the movable unit 1 can be corrected to an appropriate position.

INDUSTRIAL APPLICABILITY

The electronic device according to the present invention is suitably applied as an electronic device installed in, for example, the dashboard of a vehicle. The electronic device according to the present invention is suitably applied not only to a device installed in the dashboard of a vehicle, but also a device, such as a notebook personal computer, a PDA, and a mobile phone, including a movable unit that is turned or rotated in a predetermined direction after being pulled out of a casing for use.

The invention claimed is:

1. An electronic device comprising:
  a movable unit that is movable between a housing position where the movable unit is housed in a casing and a reference position where the movable unit is pulled out of the casing;
  a first support member that supports the movable unit on a casing side turnably in a turning direction in which the movable unit moves between the reference position and a first standing position where the movable unit stands in a first direction with respect to the reference position, and between the reference position and a second standing position where the movable unit stands in a second direction opposite to the first direction, the first support member including a pair of arms, each of the arms having an end protruding from an opening of the housing;
  a second support member that supports the movable unit rotatably about a rotation axis in a direction perpendicular to the turning direction at the reference position such that the movable unit is set to any one of a first state where one surface of the movable unit faces a third direction and a second state where the one surface of the movable unit faces a fourth direction opposite to the third direction; and
  a common stopper that is formed at an end of one of the arms to protrude in a longitudinal direction of the one of the arms, abuts the movable unit to lock the movable unit at the reference position when the movable unit is turned from the first standing position to the reference position and from the second standing position to the reference position, and positions the movable unit rotating at the reference position into any one of the first state and the second state,
  wherein the movable unit includes a first claw and a second claw at positions substantially symmetrical with respect to the rotation axis, and
  wherein the common stopper is arranged not to abut the movable unit at the first standing position and at the second standing position, is arranged to abut the first claw to position the movable unit in the first state, and is arranged to abut the second claw to position the movable unit in the second state only when the movable unit is in the reference position.

2. The electronic device according to claim 1, wherein the one surface includes at least one of a display that displays information thereon and an operation button for input operation.

3. The electronic device according to claim 1, further comprising a first driving unit that turns the movable unit between the reference position and the first standing position and between the reference position and the second standing position,
  wherein the common stopper abuts the movable unit to lock the movable unit at the reference position when the first driving unit turns the movable unit from the first standing position to the reference position and from the second standing position to the reference position.

4. The electronic device according to claim 1, further comprising a second driving unit that rotates the movable unit at the reference position,
  wherein the common stopper positions the movable unit in the second state when the second driving unit rotates the movable unit from the first state to the second state, and positions the movable unit in the first state when the second driving unit rotates the movable unit from the second state to the first state.

5. An electronic device comprising:
  a movable unit that is movable between a housing position where the movable unit is housed in a casing and a reference position where the movable unit is pulled out of the casing;
  a first support member that supports the movable unit turnably in a turning direction in which the movable unit is configured to move between the reference position and a first standing position where the movable unit stands in a first direction with respect to the reference position, and between the reference position and a second standing position where the movable unit stands in a second direction opposite to the first direction, wherein the first support member includes a pair of arms, wherein each of the arms has an end protruding from an opening of the housing;
  a second support member that supports the movable unit rotatably about a rotation axis in a direction perpendicular to the turning direction at the reference position such that the movable unit is configured to be set to any one of a first state where one surface of the movable unit faces a third direction and a second state where the one surface of the movable unit faces a fourth direction opposite to the third direction; and
  a common stopper that is formed at an end of one of the arms such that the common stopper protrudes in a longitudinal direction from the end of the one of the arms, is configured to abut the movable unit to lock the movable unit at the reference position when the movable unit is turned from the first standing position to the reference position and from the second standing position to the reference position, and is configured to position the movable unit rotating at the reference position into any one of the first state and the second state,
  wherein the movable unit includes a first claw and a second claw at positions substantially symmetrical with respect to the rotation axis, and
  wherein the common stopper is configured to not abut the movable unit at the first standing position and at the second standing position, is configured to abut the first claw to position the movable unit in the first state, and is configured to abut the second claw to position the movable unit in the second state when the movable unit is in the reference position.

6. The electronic device according to claim 5, wherein the common stopper is configured to abut the second claw to position the movable unit in the second state only when the movable unit is in the reference position.

7. The electronic device according to claim 5, wherein the one surface comprises at least one of a display that is configured to display information thereon and an operation button for input operation.

8. The electronic device according to claim 5, further comprising a first driving unit configured to turn the movable unit between the reference position and the first standing position and between the reference position and the second standing position,
wherein the common stopper is configured to abut the movable unit to lock the movable unit at the reference position when the first driving unit turns the movable unit from the first standing position to the reference position and from the second standing position to the reference position.

9. The electronic device according to claim 5, further comprising a second driving unit configured to rotate the movable unit at the reference position,
wherein the common stopper is configured to position the movable unit in the second state when the second driving unit rotates the movable unit from the first state to the second state, and is configured to position the movable unit in the first state when the second driving unit rotates the movable unit from the second state to the first state.

* * * * *